US012417265B2

(12) United States Patent
King

(10) Patent No.: US 12,417,265 B2
(45) Date of Patent: Sep. 16, 2025

(54) AUTHENTICATION SYSTEM

(71) Applicant: Paycasso Verify Ltd, London (GB)

(72) Inventor: Russell King, London (GB)

(73) Assignee: Paycasso Verify Ltd, London (GB)

( * ) Notice: Subject to any disclaimer, the term of this patent is extended or adjusted under 35 U.S.C. 154(b) by 163 days.

(21) Appl. No.: 18/109,469

(22) Filed: Feb. 14, 2023

(65) Prior Publication Data

US 2023/0259593 A1 Aug. 17, 2023

(30) Foreign Application Priority Data

Feb. 15, 2022 (GB) ..................................... 2202015

(51) Int. Cl.
*G06F 21/31* (2013.01)

(52) U.S. Cl.
CPC .................................. *G06F 21/31* (2013.01)

(58) Field of Classification Search
CPC ....... G06F 21/31; H04L 63/08; H04L 63/205; H04L 69/24
See application file for complete search history.

(56) References Cited

U.S. PATENT DOCUMENTS

2016/0028737 A1* 1/2016 Srinivasan .......... H04L 63/0807 726/4
2017/0155686 A1 6/2017 Yanacek et al.
2020/0042679 A1* 2/2020 Fuentes .................. H04W 8/18
2021/0406806 A1* 12/2021 Sadowski ...... G06Q 10/063114

OTHER PUBLICATIONS

1 United Kingdom Combined Search and Examination report dated Jun. 29, 2022 for GB Application No. 2202015.0.

* cited by examiner

*Primary Examiner* — Esther B. Henderson
(74) *Attorney, Agent, or Firm* — EIP US LLP

(57) ABSTRACT

Methods performed by an identity provider system, a service provider system and a user device are provided. The identity provider system performs an authentication process to confirm an identity of a user. In a case that the identity of the user is confirmed by the authentication process, the identity provider system determines a portion of resources made available at the service provider system that the user is allocated permission to access and generates a permission indication. The permission indication defines a portion of a structure of the resources corresponding to the portion of the resources which the user is permitted to access. The user can access resources made available by the service provider system which are both requested by user device via a resource request and permitted to be accessed by the user according to the permission indication.

9 Claims, 6 Drawing Sheets

Permission indication:
having a Date value between
01/2018 and 12/2018

61

| ID No. | Name | Surname | Age | Date |
|---|---|---|---|---|
| 1 | Amy | Jones | 5 | 13/02/2019 |
| 2 | David | Peterson | 27 | 18/05/2020 |
| 3 | Claire | Hill | 14 | 08/11/2020 |
| 4 | Simon | Barrows | 38 | 04/04/2018 |
| 5 | Amanda | Hall | 52 | 23/02/2021 |
| 6 | Peter | Smith | 19 | 23/03/2018 |
| 7 | Helen | Cross | 7 | 06/07/2019 |
| 8 | Paul | Cane | 28 | 04/02/2021 |
| 9 | Charles | Field | 13 | 05/01/2018 |
| 10 | Paula | Chimes | 89 | 06/05/2020 |

| | | | | |
|---|---|---|---|---|
| 4 | Simon | Barrows | 38 | 04/04/2018 |
| 6 | Peter | Smith | 19 | 23/03/2018 |
| 9 | Charles | Field | 13 | 05/01/2018 |

62

AUTHENTICATION SYSTEM

CROSS-REFERENCE TO RELATED APPLICATIONS

This application claims priority under 35 U.S.C. § 119(a) to United Kingdom Application No. GB 2202015.0, filed Feb. 15, 2022. The entire contents of the above-referenced patent application is hereby incorporated by reference.

BACKGROUND OF THE INVENTION

Field of the Invention

The present invention relates to an authentication system. In particular, the present invention relates to an identity provider system, a service provider system, a user device and associated methods.

Description of the Related Technology

Authentication of a user or a user device may be necessary to restrict access to resources provided by a service provider system to certain users or user devices. For example, the service provider system may permit access to data hosted on one or more servers only to authenticated users. Existing techniques can provide for the authentication to be carried out by an identity provider system which is outside of the control of, but has a trust relationship with, the service provider system.

Existing so-called 'single sign-on' (SSO) techniques use an identity provider system to determine that resources of different service providers can be accessed by a user. Following an authentication procedure for a user, the identity provider system may provide an indication to a first service provider system to allow the user to access service provider resources. The indication may be a token or response message signed using a private key of the identity provider system so that the first service provider system can verify, using the identity provider system's public key, that the user has been authenticated. The first service provider system may accordingly permit data to be accessed by the user. In some SSO implementations, the same identity provider system may generate a second indication to a second service provider system, to indicate that the user is permitted to access data provided by the second service provider system. The generation of the second indication may be done without a separate authentication procedure with the user, but instead relying on the result of the first authentication procedure. Single sign-on can reduce the number of different trust relationships that need to be maintained: in particular, service provider systems do not need to establish trust relationships with each individual user but need only maintain a single relationship with the identity provider system.

SUMMARY

According to a first embodiment there is provided a method performed by an identity provider system, the method comprising: performing an authentication process to confirm an identity of a user in response to an authentication request from a user device; and in a case that the identity of the user is confirmed by the authentication process: determining a portion of resources made available at a service provider system that the user is allocated permission to access, a structure of the resources made available at the service provider system being accessible by the identity provider system; generating a permission indication, the permission indication defining a portion of the structure of the resources corresponding to the portion of the resources which the user is permitted to access; and transmitting the permission indication.

As the permission indication defines a portion of the structure of the resources made available at the service provider system that the user is permitted to access, access to resources at the service provider system can be flexibly allocated to users at the identity provider system while allowing the service provider system to be provided with enough information to appropriately control access to resources by the user.

The method may further comprise receiving information indicating a structure of resources made available at a service provider system.

In some embodiments, the permission indication comprises one or more conditions that define one or more resource at the service provider system that the user is permitted to access. In some embodiments, the one or more conditions may comprise a condition on date or time range associated with a resource. The one or more conditions may include logical operators, such as any of AND, OR, GREATER THAN, LESS THAN, GREATER THAN OR EQUAL TO, LESS THAN OR EQUAL TO, EQUAL TO, and NOT EQUAL TO. In some embodiments, the permission indication may identify resources within the structure of resources that the user is permitted to access. Such embodiments are an example of an 'EQUAL TO' condition.

The information indicating a structure of resources may comprise information indicating the structure of one or more databases including information indicating one or more of tables of each database, fields of tables, and rows of tables.

The permission indication may define one or more conditions on one or more of tables, fields of tables, rows of tables, and values in the table that the user is permitted to access. For example, the permission indication could define a date range of a field of the table. The permission indication could indicate at least one of a table, field of a table and row of a table that the user is permitted to access.

The information indicating a structure of resources may comprise information indicating at least one of: information defining structure of one or more databases, information defining a hierarchical data structure, and information defining a plurality of folders.

In some embodiments, the information indicating a structure of resources includes information defining a hierarchical structure. The permission indication may identify resources that the user is allocated permission to access by identifying a highest level in the hierarchical structure that the user is permitted to access, wherein the permission indication indicates that the user may access all resources below the indicated level within the hierarchical structure. For example, the permission indication may identify a table that the user is permitted to access, wherein the user may access all rows and fields in the table unless otherwise specified in the permission indication.

The authentication process may comprise requesting a user to enter credentials into the user device. The authentication process may further comprise checking credentials entered by a user against previously stored credentials. The credentials may include at least one of: a user name and password, credentials provided via a physical security device such as a smartcard or security key, and biometric credentials.

The method may comprise appending a session identifier to the permission indication. The method may further comprise encrypting the session identifier and permission indication using a public key of the service provider system to generate an encrypted permission indication. Transmitting the permission indication may comprise transmitting the encrypted permission indication.

The information indicating a structure of resources made available at the service provider system may be information indicating a structure of resources relating to a data group made available at the service provider system. The service provider system may store and/or make available resources in association with a plurality of data groups. Each data group may be identified by a data group identifier. The permission indication may be generated in connection with one or more data groups and/or may contain one or more data group identifiers.

The method may further comprise determining one or more of: a characteristic associated with the user, a characteristic associated with the resources, a time and a date. Determining the portion of resources made available at the service provider system that the user is allocated permission to access may be based on a preconfigured rule and the determined one or more of the characteristic associated with the user, the characteristic associated the resources, the time and the date.

A second embodiment provides an identity provider system, comprising: a storage medium storing code portions, and a processor, wherein the processor is configured to execute the code portions to cause the identity provider system to: perform an authentication process to confirm an identity of a user in response to an authentication request from a user device; and in a case that the identity of the user is confirmed by the authentication process: determine a portion of resources made available at a service provider system that the user is allocated permission to access, a structure of the resources made available at the service provider system being accessible by the identity provider system; generate a permission indication, the permission indication defining a portion of the structure of the resources corresponding to the portion of the resources which the user is permitted to access; and transmit the permission indication.

A third embodiment provides a method performed by a service provider system, the method comprising: making available a plurality of resources for access by a user, wherein the resources have a structure; receiving a permission indication generated by an identity provider system, the permission indication defining a portion of the structure of the resources that a user is permitted to access; receiving a resource request from a user device that requests access to at least one resource of the plurality of resources; in response to the resource request, generating, based on the permission indication and the at least one resource of the plurality of resources indicated in the resource request, a resource response; and transmitting the resource response to the user device.

The method may comprise transmitting information indicating the structure of the resources made available at the service provider system to the identity provider system.

In some embodiments, the method comprises: receiving an authentication response, and in response to receiving the authentication response, allowing a user device to log-in. Logging-in the user device may include creating a session between the service provider system and the user device.

Generating the resource response may comprise comparing the portion of the structure of the resources that the user is permitted to access, defined in the permission indication, with the at least one resource identified in the resource request.

In a case that the comparison finds that the user is permitted to access all or part of the at least one resource identified in the resource request, the resource response may enable access to all or part of the at least one requested resource in accordance with the comparison. In a case that the comparison finds that the user is not permitted to access the at least one resource identified in the resource request, the resource response may prevent access to the at least one requested resource.

The method may comprise generating and storing an entry in a log file recording details of at least one of: resource requests and accesses by users to resources.

The method may further comprise receiving an access request from a user device. Responsive to receiving the access request, the service provider system may send an authentication request including a re-direct message to re-direct the user device to an identity provider system.

The step of receiving a permission indication generated by an identity provider system may comprise decrypting an encrypted permission indication. Decrypting the encrypted permission indication may comprise decrypting the encrypted permission indication using a private key of the service provider system. Receiving the permission indication may include comparing a session identifier included with the permission indication in an encrypted permission indication with a session identifier stored by the service provider system.

The service provider system may make available a plurality of resources in a plurality of data groups. Each data group may have a data group identifier. The permission indication may be associated with one or more data groups and/or include one or more data group identifiers. The resource request may be associated with one or more data groups and/or include one or more data group identifiers. Comparing the portion of the structure of the resources that the user is permitted to access, defined in the permission indication, with the at least one resource identified in the resource request may include comparing a data group identifier in the resource request with a data identifier in the permission indication.

A fourth embodiment provides a service provider system, comprising: a storage medium storing code portions, and a processor, wherein the processor is configured to execute the code portions to cause the service provider system to: make available a plurality of resources for access by a user, wherein the resources have a structure; receive a permission indication, the permission indication generated by an identity provider system and defining a portion of the structure of the resources that a user is permitted to access; receive a resource request from a user device that requests access to at least one resource of the plurality of resources; in response to the resource request, generate, based on the permission indication and the at least one resource of the plurality of resources in the resource request, a resource response; and transmit the resource response to the user device.

According to a fifth embodiment, there may be provided a method performed by a user device comprising: in response to completion of a authentication process with an identity provider system, receiving from the identity provider system a permission indication, the permission indication defining a portion of a structure of a plurality of resources made available by a service provider system that the user is permitted to access; transmitting the permission indication to the service provider system; transmitting a resource request to the service provider system that requests access to at least one resource of the plurality of resources made available by the service provider system; and receiving a resource response comprising at least one resource which is both requested by user device via the resource request and permitted to be accessed by the user according to the permission indication.

Before receiving the permission indication, the method may comprise transmitting an authentication request to the identity provider system. The authentication request may comprise an indication of an identity of the user.

The method may further comprise sending an access request to the service provider system. Responsive to sending the access request, the user device may receive a re-direct message. Responsive to receiving the re-direct message the user device may send an authentication request to the identity provider system.

According to a sixth embodiment, there may be provided a user device comprising a storage medium storing code portions, and a processor, wherein the processor is configured to execute the code portions to cause the user device to: in response to completion of an authentication process with an identity provider system, receive from the identity provider system a permission indication defining a portion of a structure of a plurality of resources made available by a service provider system that the user is permitted to access; transmit the permission indication to the service provider system; transmit a resource request to the service provider system that requests access to at least one resource of the plurality of resources made available by the service provider system; and receive a resource response comprising at least one resource which is both requested by user device via the resource request and permitted to be accessed by the user according to the permission indication.

Further embodiments provide a program comprising instructions that, when executed by an information processing apparatus, cause the information processing apparatus to perform a method according any of the first, third and fifth embodiments. The program may be stored on a non-transitory computer-readable storage medium.

BRIEF DESCRIPTION OF THE DRAWINGS

Embodiments will be described, by way of example only, with reference to the accompanying drawings in which.

DETAILED DESCRIPTION

Figure 1:
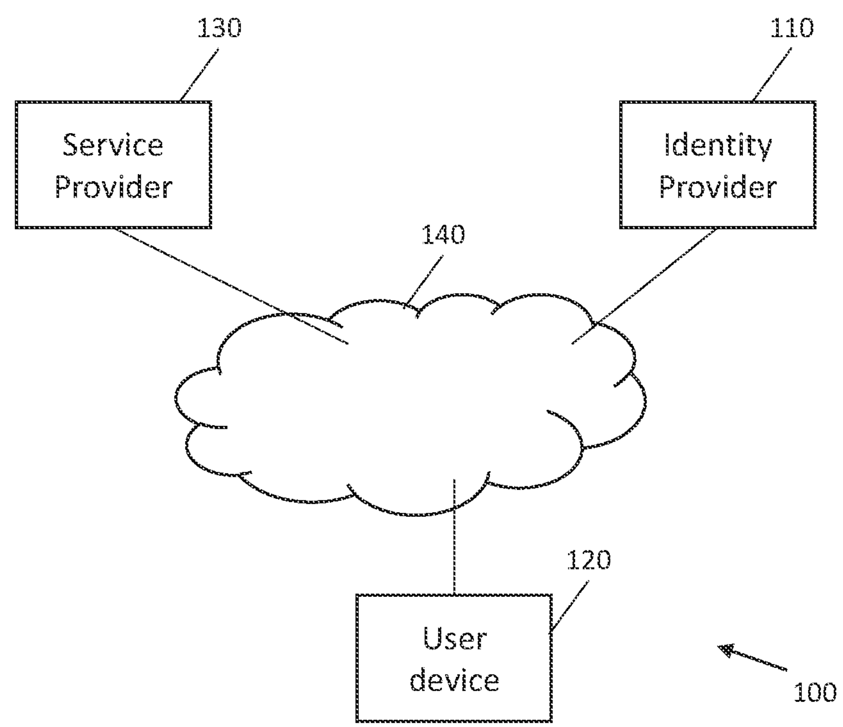
FIG. 1 is a schematic diagram of an authentication system comprising an identity provider system, a user device, and a service provider system.

FIG. 1 is a schematic diagram of an authentication system 100 comprising an identity provider system 110 for providing an authentication service, a user device 120, and a service provider system 130 for providing a service to the user device 120, such as access to data. The service provider system 130 and the identity provider system 110 are each connected to the user device 120 via a communications network 140. The communications network 140 may comprise one or more of a wireless communications network and a wired communications network.

Figure 2A:
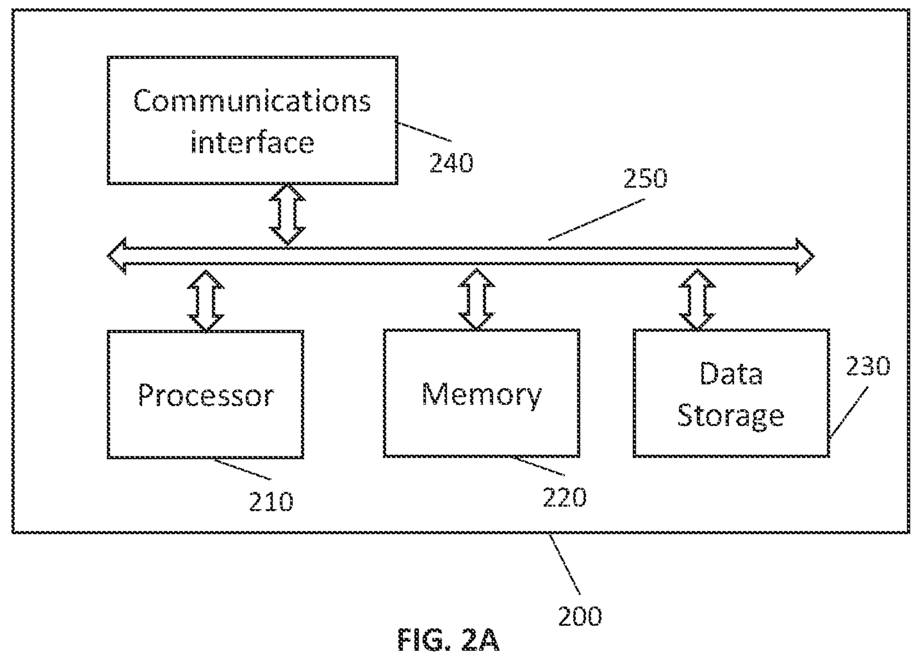
FIG. 2A is a schematic diagram of components of a computer system which may be used to implement each of the service provider system, the identity provider system, and the user device.

FIG. 2A is a schematic diagram of components of a computer system 200 that may be used to implement each of the service provider system 130, the identity provider system 110, and the user device 120. The computer system 200 comprises a processor 210, memory 220, data storage 230 and a communications interface 240 for communicating via the communications network 140. The communications interface 240 may use any suitable communications protocol, such as Wi-Fi®, Ethernet, or a wide area cellular network (such as 3GPP Long Term Evolution) protocol. The components may communicate with each other over a bus 250. Further components may be provided but are not shown or described. For example, the computer system 200 may further comprise user interface components, such as a keyboard or touch screen and/or a display screen.

The data storage 230 may comprise instructions which, when executed by the processor 210, cause the computer system 200 to carry out one or more of the methods described below.

Figure 2B:
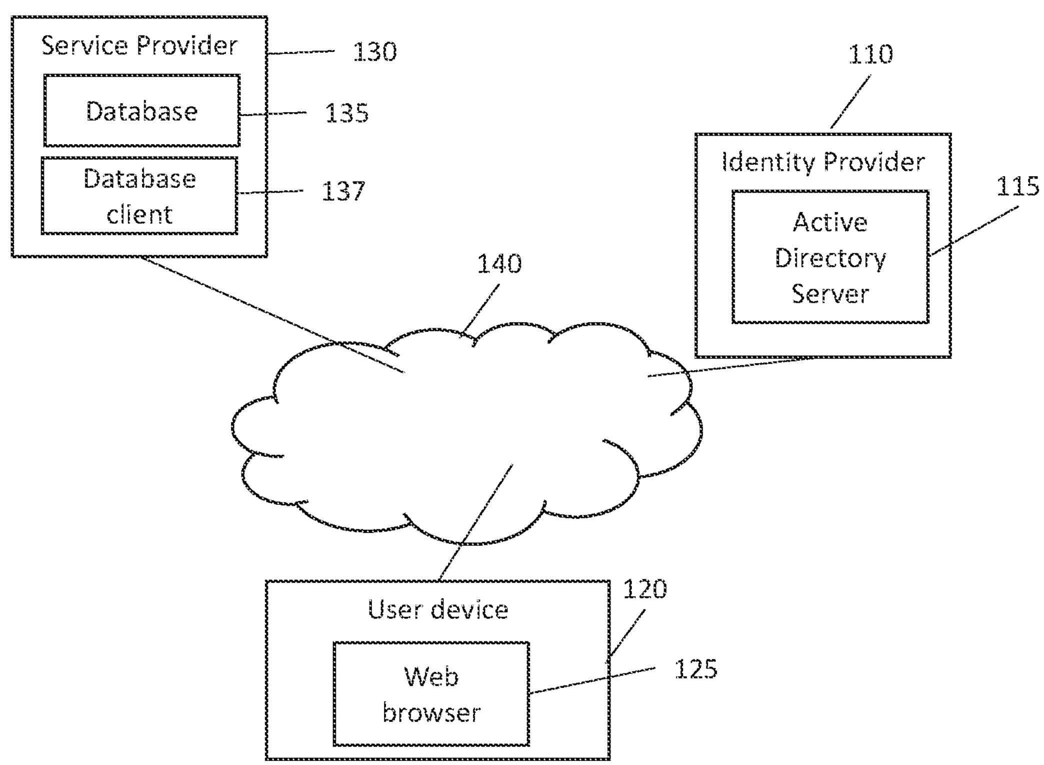
FIG. 2B is a schematic diagram of functional entities provided by respective computer systems that form the service provider system, the identity provider system, and the user device.

FIG. 2B is a schematic diagram showing functions provided by respective computer systems 200 when implementing the service provider system 130, the identity provider system 110, and the user device 120. As shown in FIG. 2B, the user device 120 may include a web browser 125 for providing a user interface to a user of the user device 120, and for generating and receiving messages via the communications interface 240.

The identity provider system 110 may include an Active Directory® server 115, which stores details of individual users. Although Active Directory® will be used as an example of an authentication function herein, there are many other directory or authentication services, such as Oracle® Identity Manager or SAP® Access Control, that could be used in other embodiments.

The service provider system 130 may include a database 135 stored on the data storage 230, the database 135 comprising data which may be made available via a database client 137 provided at the service provider system 130 to the user device 120. Data stored in the database 135 is an example of resources which may be made available by the service provider system 130 to the user device 120.

Although the service provider system 130 and the identity provider system 110 may each be implemented by a single computer system such as the computer system 200 shown in FIG. 2, it will be appreciated that any suitable architecture may be used to implement these systems. For example, one or both of the service provider system 130 and the identity provider system 110 may be implemented using distributed computing techniques, using a plurality of servers which may be in disparate geographic locations. One or both of the service provider system 130 and the identity provider system 110 may be implemented on cloud platforms.

Figure 3:
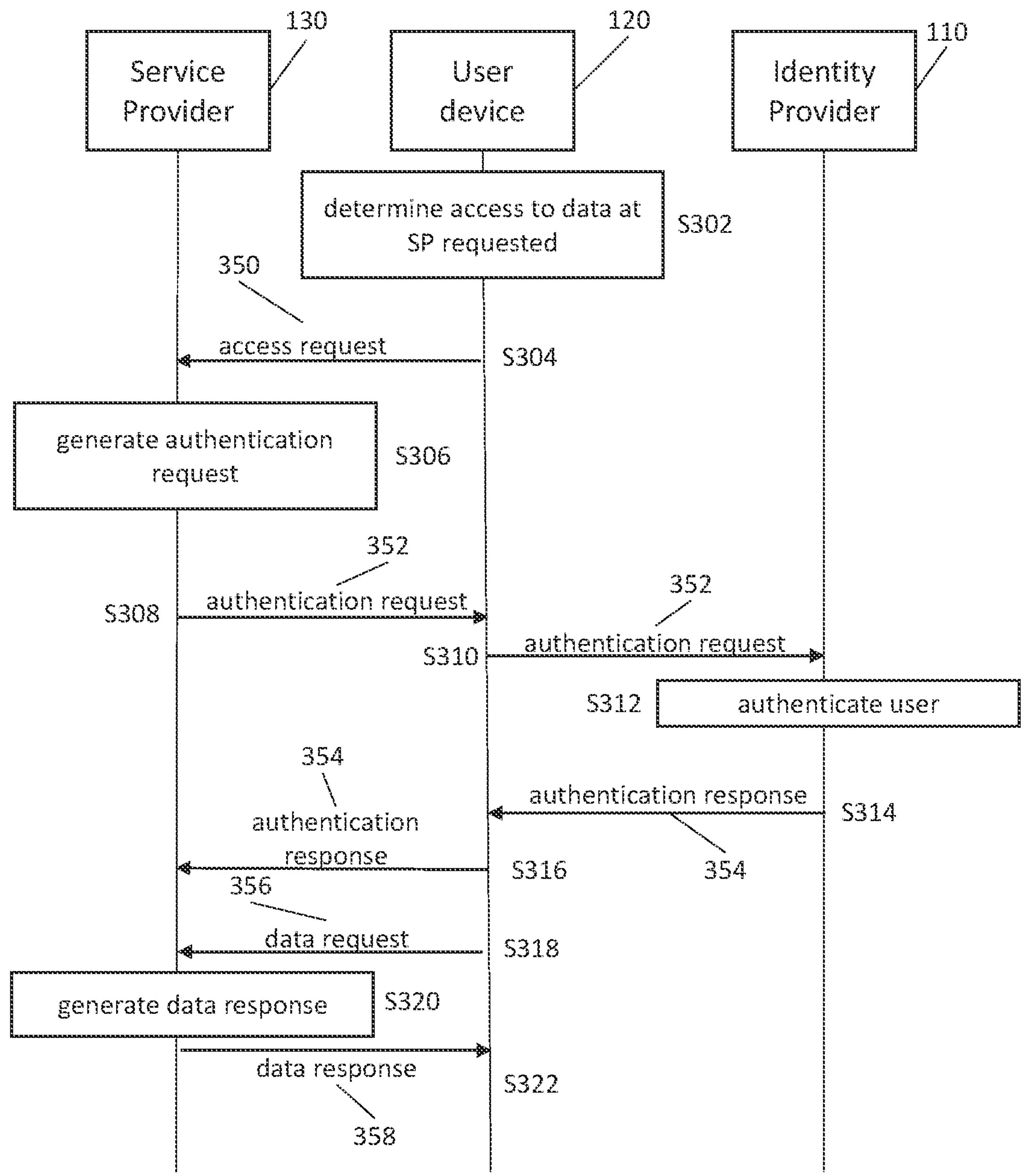
FIG. 3 shows a combined process flow chart and message sequence chart showing a single-sign on procedure.

FIG. 3 shows a combined process flow chart and message sequence chart showing an example of a single-sign on procedure in which predefined roles are used to limit the scope of resources of the service provider system 130 which are made available to a user of the user device 120. This example is provided as a comparative example for the purpose of explaining the present invention.

In the example of FIG. 3, a method is performed by the identity provider system 110 and the service provider system 130 to enable a user to access the service provider 130 based on authentication at the identity provider system 110. The method may allow 'single sign-on' (SSO). Accordingly, the identity provider system 110 may permit the authentication of the user device 120 (or a user thereof) in respect of services or resources offered by one or more service provider systems. In the present disclosure, reference may be made to authentication of a 'user', to refer to a user of the user device 120. In some examples, the authentication may be of the user device 120 itself. The authentication of the user with the identity provider system 110 may avoid the need for the user to separately authenticate with (or manage credentials separately for) each of the multiple service provider systems. Credentials used for the authentication may be exchanged only between the user device 120 and the identity provider system 110.

In the example of FIG. 3, the service provider system 130 provides access (for authenticated users) to data which is stored in the database 135 within two tables, Table A and Table B. Prior to the procedure shown in FIG. 3, two roles are preconfigured at the service provider system 130 for the purpose of granting permission to access the data: any user associated with Role 1 is permitted to access the data in Table A only and any user associated with Role 2 is permitted to access the data in both Table A and Table B. The identity provider system 110 stores (or determines) an association between a user and a role, for example at the Active Directory® server 115.

A pre-established trust relationship may be established between a user of the user device 120 and the identity provider system 110, such that the identity provider system 110 is able to authenticate the user. Similarly, a pre-established trust relationship may be established between the service provider system 130 and the identity provider system 110, such that the service provider system 130 can securely determine that the identity provider system 110 has authenticated the user.

The process of FIG. 3 starts at step S302, at which the user device 120 determines that data provided by the service provider system 130 may be required by a user. This may be in response to a user interaction at the user device 120 between a user and the web browser application 125. The user interaction may comprise a user indicating that they wish to be authenticated for access to data or resources made available by the service provider system 130. In other examples, the determination may be an autonomous determination at the user device 120 (for example, based on a pre-defined schedule).

In response to the determination at step S302, the user device 120 transmits an access request 350 to the service provider system 130 at step S304. The access request 350 may indicate the identity of the user and may indicate that the user wishes (or may wish) to subsequently access resources which are made available by the service provider system 130. The access request 350 may contain no indication of the specific resources (e.g. data) requested by the user, for example the access request 350 may be a request to log-on to the service provider system 130.

At step S306, in response to receiving the access request 350, the service provider system 130 generates an authentication request 352. The authentication request 352 may be generated in response to a determination that there is no current valid authentication of the user device 120 in respect of the service provider system 130. The authentication request 352 may comprise an indication of an identity of the user to be authenticated.

At step S308, the service provider system 130 transmits the authentication request 352 to the user device 120. The authentication request 352 may comprise, or be transmitted with, a redirect instruction. The redirect instruction may comprise an identity associated with the identity provider system 110. For example, the redirect instruction may comprise an internet protocol (IP) address of the identity provider system 110.

At step S310, the user device 120 forwards the authentication request 352 to the identity provider system 110. The transmission of the authentication request 352 by the user device 120 may be in the form of a hypertext transfer protocol (HTTP) GET message.

In some embodiments, the authentication request 352 generated at the service provider system 130 differs from the authentication request 352 transmitted by the user device 120 to the identity provider system 110. For example, the authentication request 352 generated at the service provider system 130 may comprise only the redirect instruction, and/or may omit an identity of the user to be authenticated. The authentication request 352 transmitted by the user device 120 to the identity provider system 110 may include the identity of the user to be authenticated. The authentication request 352 transmitted by the user device 120 may be generated by a web browser application 125 running on the user device 120.

At step S312, the identity provider system 110 authenticates the user. This may use any suitable authentication mechanism. The authentication may be performed by the Active Directory® function 115 provided by the identity provider system 110. The mechanism may be based on a username/password combination, biometric parameters, or any other suitable parameters. Accordingly, step S312 may comprise the transmission of one or more further messages between the user device 120 and the identity provider system 110. For example, the identity provider system 110 may transmit a request for credentials (not shown in FIG. 3) to the user device 120. The request for credentials may comprise a challenge. The user device 120 may generate a credentials response in response to the request for credentials (which may comprise a response to the challenge). The user device 120 may generate the response in accordance with known techniques. For example, the user may be requested to enter a username and password, or other shared secret. Additionally or alternatively, a cryptographic procedure may be carried out, for example using the challenge, at the user device 120 or using a device (such as a smart card) connected to the user device 120. The credentials response may be transmitted to the identity provider system 110. Accordingly, the identity provider system 110 may confirm the identity of the user.

Following a successful authentication procedure at step S312, the identity provider system 110 may determine a role associated with the user. For example, the role may be Role 1 as defined above.

At step S314, the identity provider system 110 transmits an authentication response 354 to the user device 120. The authentication response 354 may indicate the role associated with the user and thereby may indicate that the user is permitted to access all resources made available at the service provider system 130 in accordance with that role. The authentication response 354 may be encrypted and/or integrity protected. The authentication response 354 may be generated in accordance with the pre-established trust relationship between the service provider system 130 and the identity provider system 110.

At step S316, the user device 120 forwards the authentication response 354 to the service provider system 130.

In response to receiving the authentication response 354, the service provider system 130 may generate and transmit to the user device 120 an indication (not shown in FIG. 3) that the authentication procedure is complete, i.e. that the user is in principle allowed to access at least some of the data or resources made available at the service provider system 130. For example, the service provider system 130 may allow the user to log-in following successful completion of the authentication procedure. Completion of log-in may include setting up a session between the service provider system 130 and the user device 120.

At step S318, the user device 120 determines the specific data or resources which are requested by the user. This may be in response to a further interaction of the user with the web browser application 125. The user device 120 generates and transmits a resource request in the form of a data request 356 to the service provider system 130. The data request 356 may comprise, for example, a request for certain data which is stored in Table A and for other data which is stored in Table B. The data request 356 may comprise an HTTP Request for the resource or data.

At step S320, in response to receiving the data request 356, the service provider system 130 generates a resource response in the form of a data response 358 to be transmitted to the user device 120. The data response 358 is determined based on the role associated with the user indicated by the authentication response 354 and the data request 356. The determination of the role associated with the user (Role 1) may be based on the indication within the authentication response 354 or may be based on a stored mapping at the service provider system 130 between the identity of the user and the associated role. Because the role (Role 1) does not permit access to the data stored in Table B, the generated data response 358 does not include information which is stored in Table B (and is not in Table A). As Role 1 permits access to the data stored in Table A, the data which is within Table A and within the scope of the data request 356 is included within the data response 358.

At step S322, the data response 358 is transmitted to the user device 120.

At steps S308 and S314, the authentication request 352 and/or authentication response 354 may be integrity-protected and/or confidentiality-protected by means of any suitable technique. For example, integrity protection may be provided by signing the respective message using a private key of the sender. The recipient (service provider system 130 or identity provider system 110) can verify the integrity of the message using the public key of the sender.

In the example of FIG. 3, the access request 350 and data request 356 are separate messages. However, in other examples, these may be combined.

In the example shown in FIG. 3 and described above, there is a need to configure suitable roles at both the identity provider system 110 and at the service provider system 130. However, the same identity provider system 110 may be used to authenticate users in respect of different service provider systems 130, or even for different data at the same service provider system 130. In addition, it is necessary to either constrain new users to an existing role, or to coordinate the definition of new roles at both the identity provider system 110 and at the service provider system 130. In view of these challenges, there is a need to provide an improved authentication system.

In accordance with embodiments, instead of using defined roles, the identity provider system 110 determines a permission indication which indicates a subset of resources (e.g. data) provided by the service provider system 130 that the authenticated user is permitted to access and transmits this permission indication to the service provider system 130. The identity provider 110 may determine the subset of resources based on information regarding the resources at the service provider system 130 and an identity of the user. The information regarding the resources at the service provider system 130 may comprise information describing a structure of a database used to store data at the service provider system 130. The permission indication may refer to one or more portions of the structure, such as fields, or tables within a database, to indicate which portions of the data the user is permitted to access.

The subset may be characterized by one or more parameters which identify:

a. one or more tables containing data;

b. one or more data entries (e.g. rows) within a table of data;

c. one or more fields (e.g. columns) within a table of data;

d. one or more constraints on parameter values (e.g. a range of dates).

The subset may be defined positively (i.e. the parameters define data which the user is permitted to access), or negatively (i.e. the parameters define data which the user is not permitted to access) or using a combination of both positive and negative subsets. For example, the subset may specify that the user can access all data in Table A, except where the value of the “Date of Birth” field is later than Jan. 1, 2008.

The information regarding the resources may be communicated from the service provider system 130 to the identity provider system 110 in advance (i.e. prior to the identity provider system 110 receiving an authentication request 352 generated by the service provider system 130).

Accordingly, permissions can be determined for each user and signaled, in a manner which is based on the structure of the resources, thus providing granularity and flexibility of the permissions.

The permission indication may be specific to a database or collection of resources and may be specific to a user. Accordingly, a mismatch between the desired permission for a user, and the permissions associated with a role (which may be determined independently of the database or collection of resources) can be avoided.

Figure 4:
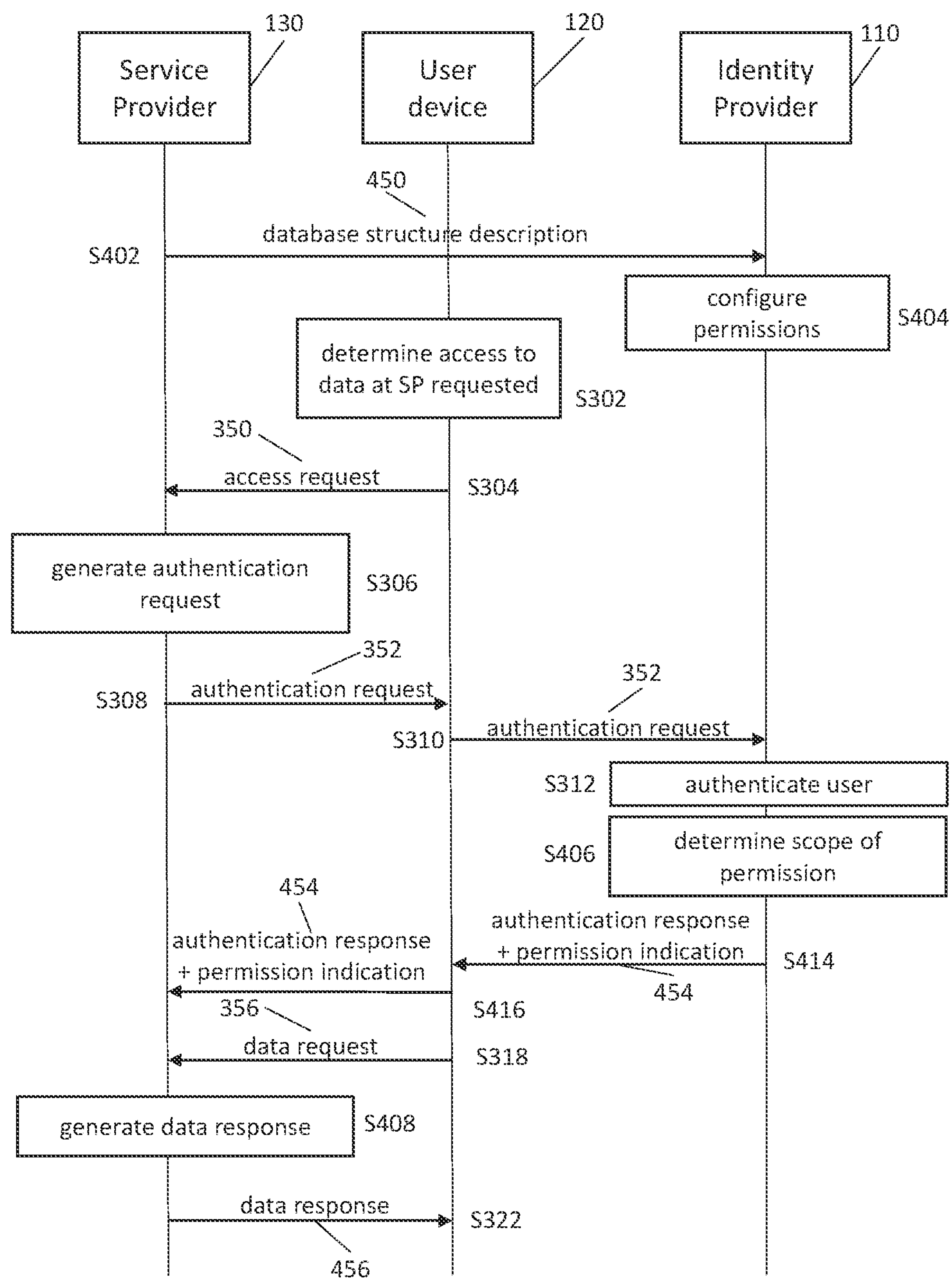
FIG. 4 is a combined process flow chart and message sequence chart showing a process for accessing data from the service provider system.

FIG. 4 is a combined process flow chart and message sequence chart showing a data request procedure in an embodiment that uses a permissions indication as described above. Steps and messages in the example of FIG. 4 may be similar to corresponding steps and messages shown in FIG. 3 and are accordingly denoted by the same reference numbers. Detailed description of these steps and messages will be omitted for conciseness.

As in the example of FIG. 3, in the example of FIG. 4 the service provider system 130 may provide access (for authenticated users) to resources such as data which is arranged in a database (such as the database 135), within two tables, Table A and Table B. However, in the example of FIG. 4, it is not necessary for roles to be defined in advance for the purpose of authenticating and granting permission to the data. Accordingly, the identity provider system 110 does not need to store any association between a user identity and a role.

A trust relationship exists between the identity provider system 110 and the service provider system 130.

Figure 5:
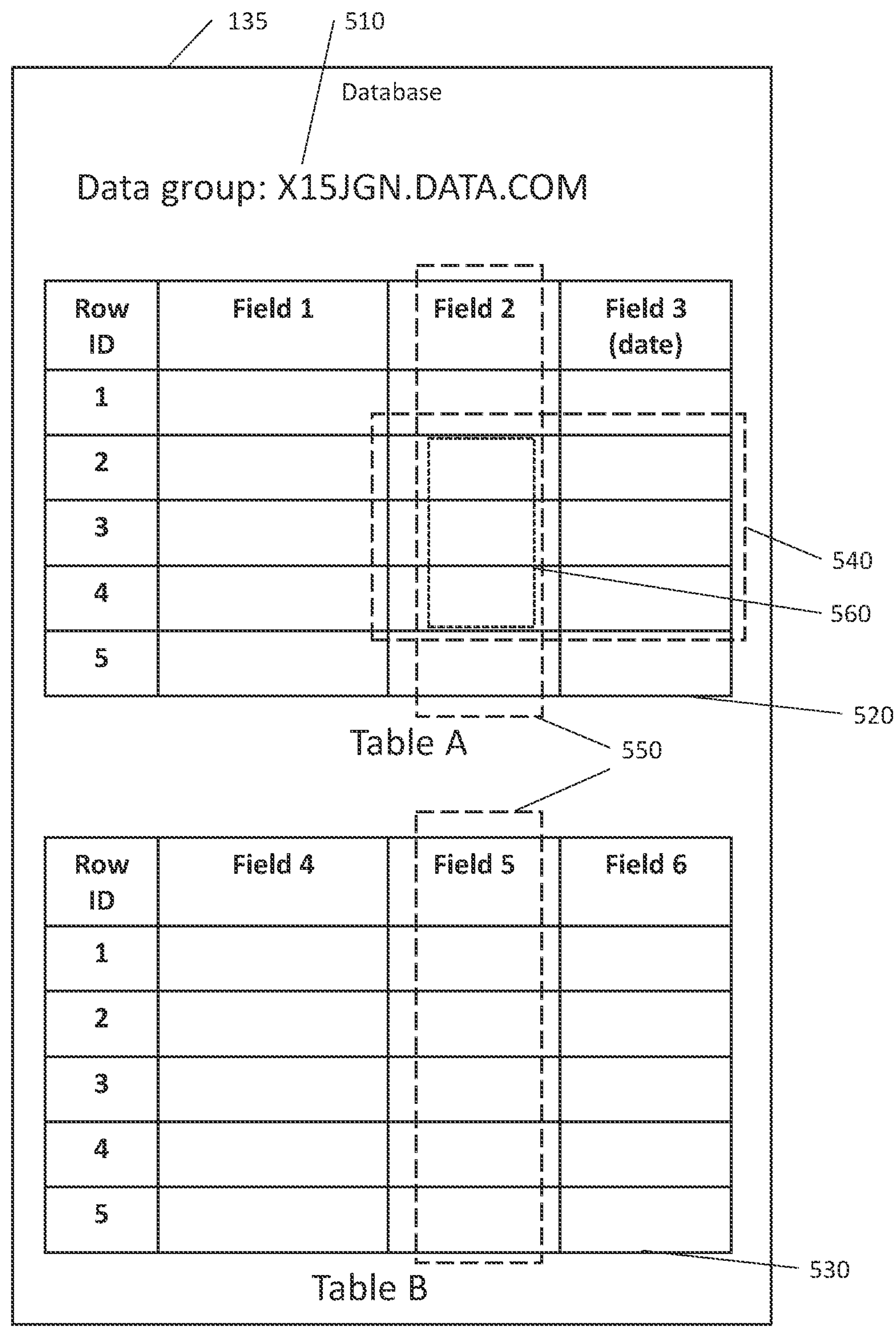
FIG. 5 is diagram of a database showing data within the scope of a permission indication, a data request, and a data response.

An example of the database 135 is shown in FIG. 5. The database 135 is associated with a data group 510 (explained in more detail below) and comprises data arranged in Table A 520 and Table B 530. The tables together form a relational database based on links between the tables (not shown in FIG. 5, but may comprise the values of certain field(s), herein referred to as "key field(s)", for at least one row).

The process of FIG. 4 starts at step S402, at which the service provider system 130 transmits, via the communication network 140, a database structure description 450 to the identity provider system 110. The database structure description is an example of information indicating a structure of resources made available at a service provider system. In a case that data is stored at the service provider system 130 using a relational database, the database structure description 450 may comprise a logical data schema. This information may include the identity of data tables within the database, fields within the tables, and the hierarchical structure of the database indicating related tables.

Referring to the example of the relational database 135 shown in FIG. 5, the database structure description 450 may comprise an indication of each of the tables 520, 530, the fields in each table, and the rows in each table. For example, the values of the key field(s) (which as noted above may form the basis of links between tables) for the or each row may be indicated. The database structure description 450 may also comprise an indication of the relationship(s) between the tables 520, 530.

Where data is stored in a non-relational database, the database structure description 450 may comprise a schema which defines tables and fields within each table. An example of a non-relational database is one using Apache Cassandra®.

In some embodiments, the database structure description 450 may include an identity of the service provider system 130 and/or an indication of a class of data/resources to which the database structure description relates. For example, where the service provider system 130 provides multiple types of data, or data associated with different organizations, there may be included an indication of the type and/or organization associated with the data which is stored. In the present description, such a set of data is referred to as a 'data group', and a corresponding indication which identifies the data group is referred to as a 'data group indication'. Where the service provider system 130 hosts only a single data group, the data group indication may comprise an identity associated with the service provider system 130. Where the service provider system 130 hosts multiple data groups (or resource groups), the data group indication may comprise an identity associated with the service provider system 130 and an identity of the data group, such that the data group indication uniquely identifies the data group. Accordingly, referring to the example of FIG. 5, the database structure description 450 may comprise an indication of the data group 510.

The database structure description 450 contains information about the structure of the data within the data group 510 to which it relates. In some embodiments, the database structure description 450 may relate to a plurality of data groups and may contain more than one data group indication. Additionally or alternatively, step S402 may be repeated and different database structure descriptions 450 may be transmitted in order to indicate the database structure associated with different data groups.

In some embodiments, the identity provider system 110 is configured with an association between a user and a portion of the data in a data group that the user is permitted to access. This association may be specific to the data group. Accordingly, the association may be between a user identity, a data group identity, and a subset of the data which the user is permitted to access. Such a configuration may be generated by means of a user interface of the identity provider system 110, which may be generated by a web server at the identity provider system 110 and a web browser or client at a further computer system. The configuration may occur after the reception of the database structure description 450.

In some embodiments, the identity provider system 110 is configured with one or more rules for determining, for a given user and a given data group, the subset or portion of the data within the data group which the user is permitted to access. The configuration of the one or more rules may be performed by an administrator by means of a user interface of the identity provider system 110 and may occur before or after the reception of the database structure description 450. In either case, the permissions assigned to a user by the configured rules will depend on the database structure description 450. In some embodiments, the use of a rule to determine the portion of the data within the data group which the user is permitted to access is carried out after the reception of the database structure description 450.

In some embodiments, a rule may be based on one or more characteristics of the user and/or one or more characteristics of the data within the data group. Alternatively, or additionally, a rule may be based on one or more other parameters, such as a current time of day, a current day of the week, and/or a current date.

Where a rule is based on one or more characteristics associated with a user, the identity provider system 110 may retrieve or otherwise determine these characteristics, e.g. from the Active Directory Server 115. Examples of a characteristic associated with a user include a geographic location of the user, a job title associated with the user, an organisational unit within which the user is located, a schedule applicable to the user (e.g. of shift times), or any other characteristic of the user. A characteristic of the user may define a manner in which the user is requesting to access the data. For example, further examples of a characteristic associated with a user include whether the user is requesting data via a web browser application or via a dedicated application, and/or whether the user is requesting data via a smartphone or via a laptop or personal computer.

Where a rule is based on one or more characteristics associated with the data within the data group, the characteristics may relate to, for example, a type of data (e.g. currency amounts), values of data (e.g. dates) or security parameters associated with a data field.

Accordingly, a rule may specify that a user having zero, one or more specified characteristics is (or is not) permitted to access data having zero, one or more specified characteristics. The rule may further specify conditions based on the current date or day, or current time. For example, a rule may specify that if the current day is denoted a national holiday, then an employee in an information technology (IT) unit of an organisation, who is currently scheduled to be on call and who is requesting access via a smartphone, may have access to all data in a particular data group except financial data.

As another example, according to a rule, an employee in a finance unit of an organisation may be permitted to access all data associated with a data group, which is associated with a date in the last 6 months, but only in respect of customers who are located within the same country as them.

In some embodiments, the database structure description 450 comprises information on one or more characteristics of data within the resources to permit the application of one or more rules. For example, in some embodiments the database structure description 450 contains information identifying fields which contain financial information or currency amounts, and/or security parameters (such as a 'secret', or 'top secret' designation) associated with some or all of the data.

The configuration of the identity provider system 110 may comprise populating the Active Directory® server 115 with the rule(s) and/or association(s).

As in the example of FIG. 3, at step S302, the user device 120 determines that access to data or resources at the service provider system 130 is required. In response to the determination at step S302, then at step S304, the access request 350 is transmitted from the user device 120 to the service provider system 130. In some embodiments, the access request 350 comprises an indication of one or more data groups which the user is requesting (or may subsequently request) access to. In some embodiments, an absence of an indication of a data group may implicitly indicate that the user is requesting (or may subsequently request) access to any data group hosted at the service provider system 130.

In response to receiving the access request 350, the service provider system 130 generates the authentication request 352 at step S306. This is transmitted at step S308 to the user device 120. At step S310, the user device 120 forwards the authentication request 352 to the identity provider system 110.

In some embodiments, one or both of the authentication request 352 generated at the service provider system 130 and the authentication request 352 transmitted by the user device 120 may include an indication of one or more data groups. This may indicate the data group(s) indicated in the access request 350.

At step S312 the identity provider system 110 authenticates the user.

As part of, or in response to, the authentication of the user at step S312, the identity provider system 110 determines a scope of permission for the user, at step S406.

The determination of the scope of permission may be based on the identity of the user. The determination may be based on information stored at the identity provider system 110 associated with the user, such as in the Active Directory® server 115.

A scope of permission may be determined for each data group indicated in the authentication request 352.

For a given data group, the determination may be carried out dynamically, based on the database structure description 450 associated with the data group, and rules configured at the identity provider system 110 for that data group, as described above.

For example, in a case in which an employee in a finance unit of an organisation is permitted to access all data associated with a data group, which is associated with a date in the last 6 months, but only in respect of customers who are located within the same country as the employee, the resulting scope of permission would be access to data in the data group identified by the data group identifier. The scope of permission will include a condition on a date field, identified within the database structure description 450, specifying a date range between a date 6 months before the current date and the current date, and a condition on a country field, identified within the database structure description 450, equal to a country value associated with the employee obtained from the Active Directory.

In some embodiments, all or a part of step S406 may occur prior to step S310 and/or step S312. For example, prior to step S312, the identity provider system 110 may store a scope of permissions for the user. The identity provider system 110 may store a scope of permissions for the user for one or more data groups for which database structure information 450 has been provided by a service provider system 130. Accordingly, in such embodiments, in response to determining the identity of the user (and, in some embodiments, the data group associated with the authentication request 352), the identity provider system 110 may retrieve the appropriate stored scope of permissions.

As described above, in other implementations, the scope of permission for that user may have been previously manually configured at the identity provider system 110 by an administrator, and the determining in step 406 may comprise retrieving the stored scope of permission, for example from the Active Directory® server 115.

In the example of FIG. 5, the determined scope of permission 540 for the user corresponds to the data which is within Table A, Field 2 and Field 3, and in rows having Row ID values from 2 to 4 inclusive.

After the authentication process at step S312 and the determination of the scope of permission at step S406 are complete, a permission indication is generated and transmitted by the identity provider system 110.

In some embodiments (as in the example of FIG. 4), a combined authentication response and permission indication 454 is generated and transmitted. This confirms the identity of the user and comprises the permission indication which indicates of the scope of permissions associated with the user.

In some other embodiments, an authentication response and permission indication are transmitted separately. The authentication response may confirm the identity of the user, and the permission indication may comprise an indication of the scope of permissions associated with the user.

The permission indication and/or the authentication response (or both combined) are transmitted to the service provider system 130. This transmission may be direct or may be via the user device 120.

In the example shown in FIG. 4, the combined authentication response and permission indication 454 is transmitted by the identity provider system 110 to the user device 120 at step S414. The combined authentication response and permission indication 454 is forwarded by the user device 120 to the service provider system 130 at step S416. As before, receipt of the combined authentication response and permission indication 454 at the service provider system 130 may allow the user to log-in to the service provider system 130. The user device 120 may establish a session with the service provider system 130.

The permission indication and/or the authentication response (or both combined) may be transmitted in the form of a hypertext markup language (HTML) form.

In some embodiments, the permission indication and/or the authentication response (or both combined) may be transmitted by the user device 120 to the service provider system 130 in an HTTP POST message. The HTTP POST message may be created by a web browser application on the user device 120.

The permission indication may be signed by the identity provider system 110 to allow the service provider system 130 to verify its origin.

In some embodiments, the permission indication is encrypted by the identity provider system 110 using a public key belonging to the service provider system 130. The encryption may be carried out by the Active Directory® server 115, or by another software function. The service provider system 130 may decrypt the permission indication using a corresponding private key.

In some embodiments, the permission indication may comprise a session identifier (ID) which is included in the permission indication prior to encryption. This would prevent the system possibly being compromised by a third-party intercepting and replicating the permission indication in a replay attack. The session identifier may be provided by the service provider system 130 to the identity provider system 110 in the authentication request 352.

The permission indication may have a format which is based on the corresponding database structure description 450 (i.e. for the same data or data group). For example, where the data is organized as a relational database, the database structure description 450 may include information on tables, fields, and an indication of key fields that link tables in the relational database. In such an example, the permission indication may indicate any of tables, related tables, fields and/or values within the tables to which the identity provider system 110 permits the user to have access.

Where the data is not organized as a relational database, the database structure information 450 may include information on tables and fields. In such an example, the permission indication may indicate tables, fields, and/or values within the respective tables to which the identity provider system 110 permits the user to have access.

The permission indication may define every entry within a given table that the user may access. For instance, referring to the example in FIG. 5, as described above, permissions could be given for the user to access Table A, entries where the Row ID=2-4, and columns associated Field 2 and Field 3 (which may correspond, for example, to Surname, and date of birth, respectively). The user is not permitted to access entries within the table not falling within this scope, such as any data associated with Row ID=5, or any data in Field 1 (which might, for example, indicate a medical condition). The permissions may be as granular and fine-tuned as desired. For instance, in another example in which the data relates to medical information, the permission indication could indicate that the user is permitted to access only data which i) relates to a specific patient, ii) relates to procedures carried out between certain dates or iii) relates to a specific type of procedure.

Figure 6:
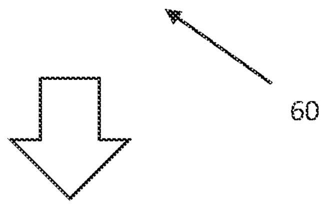
FIG. 6 is a diagram of a table showing operation of a permission indication including a condition on a Date field of a table.

The permission indication may comprise an indication of one or more conditions which relate to a field or table. FIG. 6 is a diagram of a table 60 showing operation of a permission indication 61 including a condition on a Date field of table 60. In this example, the table 60 includes five fields providing personal details of patients in a medical facility. The table has a field 'ID No.', which uniquely identifies each patient. The remaining fields include personal details for each patient. The remaining fields are: 'Name', 'Surname', 'Age', and 'Date', where 'Date' indicates the date of admission of the patient to the medical facility. In this example, a statistician may be asked to prepare statistics related to the medical facility and the statistician may be provided with permission at the identity provider system 110 to access records in the table 60 for the year 2018. The identity provider system 110 may accordingly generate a permission indication with a condition 'having a Date value between Jan. 2018 and Dec. 2018' to indicate that the statistician is permitted to access only records including a date value within the specified date range. Referring to FIG. 6, the data that the statistician can access is illustrated by data 62, which shows rows 4, 6 and 9 which have 'Date' values that meet the condition defined in the permission indication 61.

This approach is convenient for specifying particular data within the database.

The permission indication may be defined such that, unless explicitly specified, a user has access to all data items. For example, where the permission indication indicates that access to a given table is permitted, this would imply that access to all entries within that table is permitted unless otherwise indicated explicitly. In another example, an indication of permission for Table A, Row ID=1 would imply that access is permitted to all fields in Table A associated with Row ID=1 unless otherwise specified. Thus, the amount of information in the permission indication can be reduced.

Accordingly, for example, the permission indication corresponding to the determined scope of permission 540 shown in FIG. 5 may comprise the following:

a. an indication of the data group 510;
b. an indication of the user;
c. an indication that the scope of permission 540 is defined by data which is:
  i. in Table A, AND
  ii. in either Field 2 or Field 3, AND
  iii. in a row having a Row ID of between 2 and 4 inclusive.

Although the permission indication in this example uses a logical 'AND' operation to define the corresponding scope of permission, in some examples, the permission indication may additionally or alternatively use one or more logical 'OR' operations, and/or one or more logical 'NOT' operations.

At step S318, a data request 356 is transmitted from the user device 120 to the service provider system 130. Referring to the example of FIG. 5, the data request 356 may comprise a request for data 550, which comprises the values in Field 2 of Table A, for all rows, and the values in Field 5 of Table B, for all rows.

In response to receiving the data request 356 (indicating the specific data values requested by the user), the service provider system 130 may check if it has also received the authentication response and the permission indication. In some embodiments, the service provider system 130 may proceed to step S408 only if the permission indication indicates permission to access data within a data group which contains the data requested by the data request 356. In some embodiments, the service provider system 130 may proceed to step S408 only if the authentication response confirms the identity of the user, and that identity matches the identity of the user indicated in the permission indication.

If all necessary conditions are satisfied, then the service provider system 130 generates a data response 456 at step S408.

The data response 456 is generated based on both the data request 356 and the permissions or restrictions (e.g. in respect of date ranges, permitted fields or tables of a database) indicated by the permission indication. In particular, the service provider system 130 compares the data requested against the data that the user is permitted to access as defined by the permission indication 454.

In the example of FIG. 5, the data response 456 does not include any data from Table B, because this is outside of the scope of the permission 540 as indicated by the permission indication. In addition, the data response 456 does not include any data from rows with Row ID 1 or 5 from Table A, because these also fall outside of the scope of the permission 540. Accordingly, the data response 456 includes response data 560, which includes the values of Field 2 for rows with Row ID 2, 3 and 4.

In another example with reference to the table 60 shown in FIG. 6, the permission indication may indicate that the user is permitted to access data in the table 60 where the value of the date field is between 1 Jan. 2020 and today. The user may attempt to access a record associated with patient Claire Hill from 8 Nov. 2020 in Table A. The service provider system 130 determines whether the permissions for the user as defined in the permission indication match the record i.e. it determines whether the permission indication indicates that the user is allowed access to the data item. If so, access is granted and the data response 456 includes the relevant data which the user is permitted to access.

In some embodiments, an entry is added to a log file at the service provider system 130 in response to each data request 356, the entry comprising one or more of an identity of the requesting user, the nature of the data request (e.g. the data requested), the permission indication used to evaluate the data request, and the result of the evaluation (e.g. the data included in the data response). The log file may be subsequently transmitted to another system, for example in response to a request from an administrator of the service provider system 130. The log file may contain useful information for complying with a regulatory requirement, such as for Sarbanes-Oxley compliance. The log file may itself be an example of a resource which is provided by the service provider system 130 and accessed in accordance with the techniques disclosed herein.

In the example of FIG. 4, there is a single data request 356. However, in some embodiments, there may be two or more data requests which are evaluated using a single permission indication. For example, after the data request 356 is received, a subsequent data request may be received. The subsequent data request may be evaluated using the same permission indication used to evaluate the first data request 356.

Accordingly, in some embodiments, the service provider system 130 may store a permission indication associated with a user, which is used to evaluate the subsequent data request and to generate a subsequent data response. A log file entry may be created in respect of each such evaluation. The permission indication may be stored for the duration of a session between the user device 120 and the service provider system 130. For example, the permission indication may be stored for the time that the user is continuously logged in to the service provider system 130.

In other embodiments, a new permission indication may be obtained in response to each data request.

Embodiments of an authentication system are described above in which the data request 356 is in respect of data arranged in a database at the service provider system 130. Further embodiments are also contemplated in the present disclosure. In an example embodiment, the information indicating a structure of resources made available at a service provider system may describe a hierarchical structure of folders and/or files. Similarly, the permission indication may be based on such a structure. For example, where the structure is a hierarchical structure, the permission indication may indicate one or more folder names (such as 'accounts' or 'reports') or parameters of files (e.g. date modified, file type) that characterize folders and/or files which the user has permission to access. In addition or alternatively, the permission indication may indicate one or more folders and/or files which the user is not permitted to access. A similar (positive or negative) permission indication may accordingly indicate the permission applicable to all child folders of the indicated folder. The permission indication may further indicate whether the user has permission to read only, or to modify one or more resources.

In some embodiments, the order of steps and message transmissions may be different from that described above. For example, in some embodiments, the data request 356 may be transmitted to the service provider system 130 before the authentication response and/or permission indication is received at the service provider system 130.

Some example embodiments include the following:

Clause 1. A method performed by an identity provider system, the method comprising: performing an authentication process to confirm an identity of a user in response to an authentication request from a user device; and in a case that the identity of the user is confirmed by the authentication process: determining a portion of resources made available at a service provider system that the user is allocated permission to access, a structure of the resources made available at the service provider system being accessible by the identity provider system; generating a permission indication, the permission indication defining a portion of the structure of the resources corresponding to the portion of the resources which the user is permitted to access; and transmitting the permission indication.

Clause 2. A method according to clause 1, further comprising receiving information indicating the structure of resources made available at the service provider system.

Clause 3. A method according to clause 1 or clause 2, wherein the permission indication comprises one or more conditions that define one or more resource at the service provider system that the user is permitted to access.

Clause 4. A method according to any preceding clause wherein the information indicating a structure of resources comprises information indicating the structure of one or more databases including information indicating one or more of tables of each database, fields of tables, and rows of tables.

Clause 5. A method according to clause 4, wherein the permission indication defines one or more conditions on one or more of tables, fields of tables, rows of tables and values in the table that the user is permitted to access.

Clause 6. A method according to any of clauses 1 to 3, wherein the information indicating a structure of resources comprises information indicating at least one of: information defining structure of one or more databases, information defining a hierarchical data structure, and information defining a plurality of folders.

Clause 7. A method according to any preceding clause, wherein: the information indicating a structure of resources includes information defining a hierarchical structure; and the permission indication identifies resources that the user is allocated permission to access by identifying a highest level in the hierarchical structure that the user is permitted to access, wherein the permission indication indicates that the user may access all resources below the indicated level within the hierarchical structure.

Clause 8. A method according to any preceding clause, further comprising appending a session identifier to the permission indication and encrypting the session identifier and permission indication using a public key of the service provider system to generate an encrypted permission indication, wherein transmitting the permission indication comprises transmitting the encrypted permission indication.

Clause 9. A method according to any preceding clause, further comprising determining one or more of: a characteristic associated with the user, a characteristic associated with the resources, a time, and a date; wherein the determining the portion of resources made available at the service provider system that the user is allocated permission to access is based on a preconfigured rule and the determined one or more of the characteristic associated with the user, the characteristic associated the resources, the time and the date.

Clause 10. An identity provider system, comprising: a storage medium storing code portions, and a processor, wherein the processor is configured to execute the code portions to cause the identity provider system to: perform an authentication process to confirm an identity of a user in response to an authentication request from a user device; and in a case that the identity of the user is confirmed by the authentication process: determine a portion of resources made available at a service provider system that the user is allocated permission to access, a structure of the resources made available at the service provider system being accessible by the identity provider system; generate a permission indication, the permission indication defining a portion of the structure of the resources corresponding to the portion of the resources which the user is permitted to access; and transmit the permission indication.

Clause 11. A program that, when executed by an identity provider system, causes the identity provider system to perform a method according to any of clauses 1 to 9.

Clause 12. A method performed by a service provider system, the method comprising: making available a plurality of resources for access by a user, wherein the resources have a structure; receiving a permission indication generated by an identity provider system, the permission indication defining a portion of the structure of the resources that a user is permitted to access; receiving a resource request from a user device that requests access to at least one resource of the plurality of resources; in response to the resource request, generating, based on the permission indication and the at least one resource of the plurality of resources indicated in the resource request, a resource response; and transmitting the resource response to the user device.

Clause 13. A method according to clause 12, the method comprising: transmitting information indicating a structure of resources made available at the service provider system to the identity provider system.

Clause 14. A method according to clause 12 or clause 13, wherein the method comprises: receiving an authentication response, and in response to receiving the authentication response, allowing log-in to create a session between the service provider system and the user device.

Clause 15. A method according to any of clauses 12 to 14, wherein generating the resource response comprises comparing the portion of the structure of the resources that the user is permitted to access, defined in the permission indication, with the at least one resource identified in the resource request.

Clause 16. A method according to clause 15, wherein in a case that the comparison finds that the user is permitted to access all or part of the at least one resource identified in the resource request, the resource response enables access to all or part of the at least one requested resource in accordance with the comparison and, in a case that the comparison finds that the user is not permitted to access the at least one resource identified in the resource request, the resource response prevents access to the at least one requested resource.

Clause 17. A method according to clause 16, wherein the method comprises generating and storing an entry in a log file recording details of at least one of: resource requests and accesses by users to resources.

Clause 18. A method according to any of clauses 12 to 17, further comprising: receiving an access request from a user device; and responsive to receiving the access request, sending an authentication request including a re-direct message to re-direct the user device to an identity provider system.

Clause 19. A service provider system, comprising: a storage medium storing code portions, and a processor, wherein the processor is configured to execute the code portions to cause the service provider system to: make available a plurality of resources for access by a user, wherein the resources have a structure; receive a permission indication, the permission indication generated by an identity provider system and defining a portion of the structure of the resources that a user is permitted to access; receive a resource request from a user device that requests access to at least one resource of the plurality of resources; in response to the resource request, generate, based on the permission indication and the at least one resource of the plurality of resources in the resource request, a resource response; and transmit the resource response to the user device.

Clause 20. A program that, when executed by a service provider system, causes the service provider system to perform a method according to any of clauses 12 to 18.

What is claimed is:

1. A method performed by an identity provider system, the method comprising:

receiving information indicating a structure of resources made available at a service provider system;

performing an authentication process to confirm an identity of a user in response to an authentication request from a user device; and in a case that the identity of the user is confirmed by the authentication process:

determining a portion of the resources made available at the service provider system that the user is allocated permission to access;

generating a permission indication, the permission indication defining a portion of the structure of the resources corresponding to the portion of the resources which the user is permitted to access; and transmitting the permission indication, wherein the information indicating the structure of resources includes information defining a hierarchical structure;

the permission indication identifies resources that the user is allocated permission to access by identifying a highest level in the hierarchical structure that the user is permitted to access; and the resources comprise data stored at the service provider system using a relational database and the permission indication indicates that the user may access all resources below the indicated level within the hierarchical structure except those within an indicated subset.

2. A method according to claim 1, wherein the permission indication comprises one or more conditions that define one or more resource at the service provider system that the user is permitted to access.

3. A method according to claim 1 wherein the information indicating a structure of resources comprises information indicating the structure of one or more databases including information indicating one or more of tables of each database, fields of tables, and rows of tables.

4. A method according to claim 3, wherein the permission indication defines one or more conditions on one or more of tables, fields of tables, rows of tables and values in the table that the user is permitted to access.

5. A method according to claim 1, wherein the information indicating a structure of resources comprises information indicating at least one of:

information defining structure of one or more databases, information defining a hierarchical data structure, and information defining a plurality of folders.

6. A method according to claim 1, further comprising appending a session identifier to the permission indication and encrypting the session identifier and permission indication using a public key of the service provider system to generate an encrypted permission indication, wherein transmitting the permission indication comprises transmitting the encrypted permission indication.

7. A method according to claim 1, further comprising determining one or more of:

a characteristic associated with the user,
a characteristic associated with the resources,
a time, and
a date;

wherein the determining the portion of resources made available at the service provider system that the user is allocated permission to access is based on a preconfigured rule and the determined one or more of the characteristic associated with the user, the characteristic associated the resources, the time and the date.

8. An identity provider system, comprising:

a non-transitory storage medium storing code portions, and a processor, wherein the processor comprises hardware and is configured to execute the code portions to cause the identity provider system to:

receive information indicating a structure of resources made available at a service provider system;

perform an authentication process to confirm an identity of a user in response to an authentication request from a user device; and in a case that the identity of the user is confirmed by the authentication process:

determine a portion of the resources made available at the service provider system that the user is allocated permission to access;

generate a permission indication, the permission indication defining a portion of the structure of the resources corresponding to the portion of the resources which the user is permitted to access; and transmit the permission indication, wherein the information indicating a structure of resources includes information defining a hierarchical structure;

the permission indication identifies resources that the user is allocated permission to access by identifying a highest level in the hierarchical structure that the user is permitted to access; and the resources comprise data stored at the service provider system using a relational database and the permission indication indicates that the user may access all resources below the indicated level within the hierarchical structure except those within an indicated subset.

9. A non-transitory computer readable storage medium storing a program that, when executed by an identity provider system, causes the identity provider system to perform a method comprising:

receive information indicating a structure of resources made available at a service provider system;

performing an authentication process to confirm an identity of a user in response to an authentication request from a user device; and in a case that the identity of the user is confirmed by the authentication process:

determining a portion of the resources made available at the service provider system that the user is allocated permission to access;

generating a permission indication, the permission indication defining a portion of the structure of the resources corresponding to the portion of the resources which the user is permitted to access; and transmitting the permission indication, wherein the information indicating a structure of resources includes information defining a hierarchical structure;

the permission indication identifies resources that the user is allocated permission to access by identifying a highest level in the hierarchical structure that the user is permitted to access; and the resources comprise data stored at the service provider system using a relational database and the permission indication indicates that the user may access all resources below the indicated level within the hierarchical structure except those within an indicated subset.

* * * * *